United States Patent
Zhong et al.

(10) Patent No.: US 9,552,425 B2
(45) Date of Patent: Jan. 24, 2017

(54) SYSTEM AND METHOD FOR DETERMINING QUERY ASPECTS AT APPROPRIATE CATEGORY LEVELS

(75) Inventors: Qian Zhong, San Jose, CA (US); Guanglei Song, San Jose, CA (US); Zhaohui Chen, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 485 days.

(21) Appl. No.: 13/152,174

(22) Filed: Jun. 2, 2011

(65) Prior Publication Data

US 2012/0310973 A1 Dec. 6, 2012

(51) Int. Cl.
*G06F 17/30* (2006.01)

(52) U.S. Cl.
CPC ... *G06F 17/30867* (2013.01); *G06F 17/30625* (2013.01); *G06F 17/30643* (2013.01); *G06F 17/30687* (2013.01); *G06F 17/30705* (2013.01); *G06F 17/30734* (2013.01)

(58) Field of Classification Search
CPC .............. G06F 17/30625; G06F 17/30643; G06F 17/30687; G06F 17/30705; G06F 17/30734; G06F 17/30867
See application file for complete search history.

(56) References Cited

U.S. PATENT DOCUMENTS

| | | | |
|---|---|---|---|
| 6,353,813 B1 * | 3/2002 | Breese et al. | 706/12 |
| 2003/0014403 A1 * | 1/2003 | Chandrasekar et al. | 707/5 |
| 2007/0233671 A1 * | 10/2007 | Oztekin et al. | 707/5 |
| 2008/0091443 A1 * | 4/2008 | Strope et al. | 705/1 |
| 2011/0055040 A1 * | 3/2011 | Foster et al. | 705/26.3 |

* cited by examiner

*Primary Examiner* — Rehana Perveen
*Assistant Examiner* — Huen Wong
(74) *Attorney, Agent, or Firm* — Schwegman, Lundberg & Woessner, P.A.

(57) ABSTRACT

In various example embodiments, a system and method for determining query aspects for appropriate categories is provided. In example embodiments, query data is collected. The query data indicates a query term and tracked user behavior associated with past queries involving the query term. An aspect demand ratio is calculated for each category of a category tree based on the collected query data. Using at least one processor, one or more lowest categories of the category tree that satisfies a category threshold is determined. The one or more lowest categories are then appended to the query term and stored in a database.

17 Claims, 15 Drawing Sheets

Women's Jeans
   Size
      4
      8
      10
   Brand
      7 For All Mankind
      True Religion
      American Eagle
   Style
      Boot Cut
      Slim/Skinny
      Low Rise/Hipster Men's Jeans
   Waist Size
      34
      38
   Brand
      Levis
      Diesel
      7 For All Mankind
      Ralph Lauren
   Inseam
   Style
      Boot Cut
      Straight Leg
      Relaxed
Jr. Boy's Jeans
Jr. Girl's Jeans

FIG. 7b

SYSTEM AND METHOD FOR DETERMINING QUERY ASPECTS AT APPROPRIATE CATEGORY LEVELS

FIELD

The present disclosure relates generally to query aspects, and in a specific example embodiment, to determining query aspects at appropriate category levels.

BACKGROUND

In conventional information retrieval systems, a user may be required to navigate through multiple levels of categories to reach a useful aspect. For example, a search for an item "jeans" may return a result that requires the user to navigate (e.g., click) through a hierarchy or category tree of "women's clothes" and "women's jeans" before seeing useful aspects such as brand, wash/color, and style.

BRIEF DESCRIPTION OF DRAWINGS

Various ones of the appended drawings merely illustrate example embodiments of the present invention and cannot be considered as limiting its scope.

FIG. 7a-7b are sample user interfaces illustrating usage of example embodiments.

DETAILED DESCRIPTION

Figure 1:
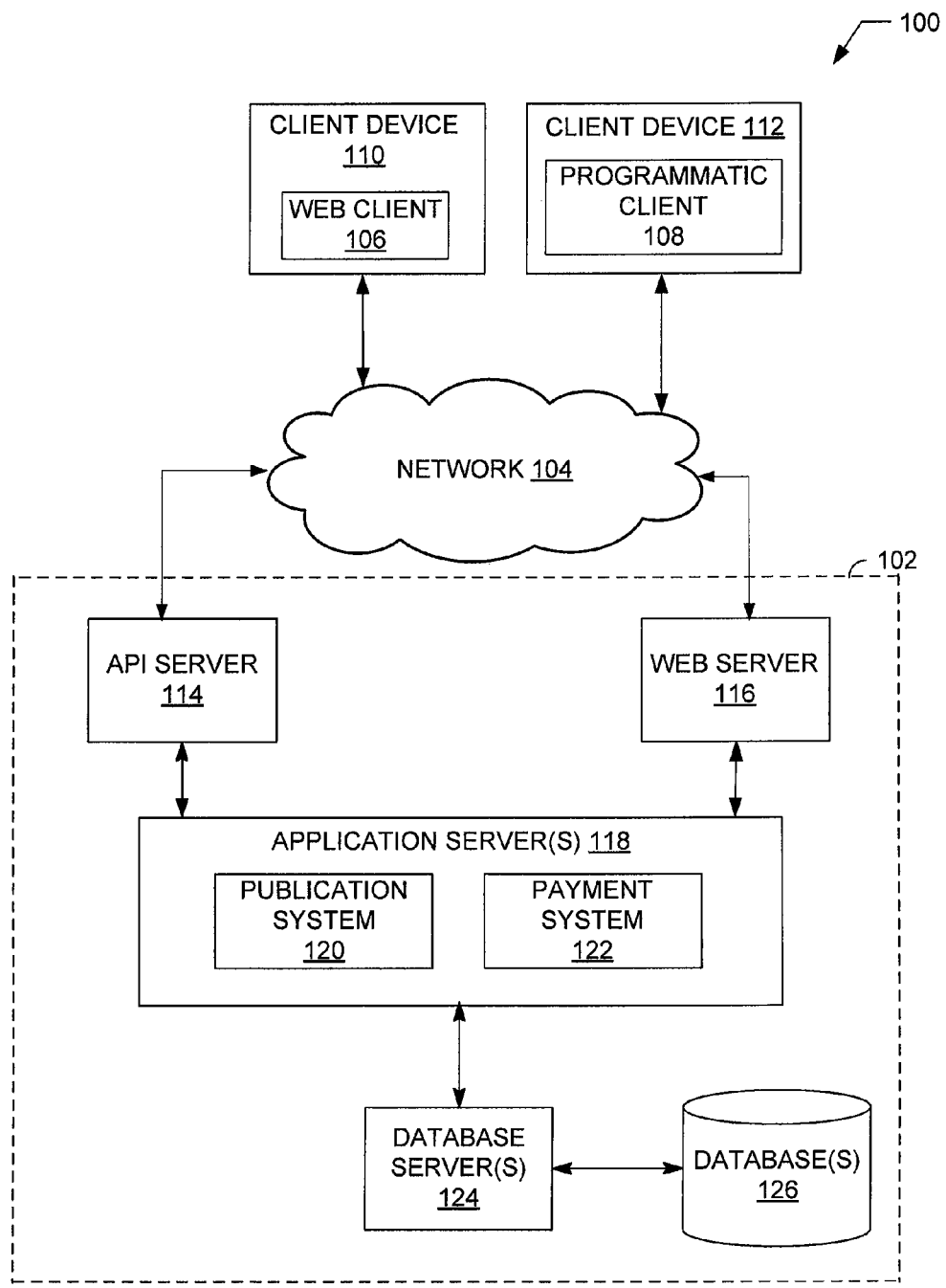
FIG. 1 is a block diagram illustrating an example embodiment of a network architecture of a system used to determining query aspects.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

As used herein, the term "or" may be construed in either an inclusive or exclusive sense. Additionally, although various example embodiments discussed below focus on a marketplace environment, the embodiments are given merely for clarity in disclosure. Thus, any type of electronic publication, electronic commerce, or electronic business system and method, including various system architectures, may employ various embodiments of the content system and method described herein and may be considered as being within a scope of example embodiments. Each of a variety of example embodiments is discussed in detail below.

Example embodiments described herein provide systems and methods to determine appropriate category levels and corresponding relevant query aspects. Using historical (tracked) user behavior data, the most appropriate categories for a query may be determined. For example, associating a query for jeans with a clothing, shoes, and accessories (CSA) category may be too broad. However, associating a jeans query with a low-rise jeans category or aspect (e.g., attribute of an item) may be too narrow. Instead, some example embodiments provide processor implemented modules that perform operations to determine the most suitable categories and aspects to append to "jeans" (e.g., Men's Jeans, Women's Jeans, Jr. Boy's Jeans, and Jr. Girl's Jeans). Additionally, the most relevant query aspects (e.g., aspect name/value pairs) for each category may be determined from the historical user behavior data (e.g., brand, size, style). The query aspects comprise attributes or characteristics of an item which in some embodiments may be in the form of metadata. For example, the Women's Jeans category may comprise relevant query aspects of brand, size, and style.

In example embodiments, query data is collected. The query data indicates a query term and tracked user behavior associated with past queries involving the query term. An aspect demand ratio is calculated for each category of a category tree based on the collected query data. The aspect demand ratio may be calculated by determining aspect demand data for each category of the category tree from the collected query data. The aspect demand data indicates aspect name/aspect value pairs from the past queries. Next, aspect demand data is populated up to all higher level categories in the category tree from lower level categories. Counts of the aspect demand data may then be aggregated for each category of the category tree. The counts of the aspect demand data are used in the calculating of the aspect demand ratio.

Based on the aspect demand ratio, one or more lowest categories of the category tree that satisfies a category threshold are determined. The one or more lowest categories are then appended to the query term and stored in a database. Additionally, one or more relevant aspect names and corresponding one or more relevant aspect value may be determined for the one or more lowest categories.

A database of the appropriate categories and most relevant aspects for a plurality of search queries is compiled and may be periodically updated based on more recent historical user behavior data. When a new query is received, a look-up of the database may be performed to find the appropriate categories and corresponding relevant aspects appended to a query term (e.g., appended to the query keywords).

By using embodiments of the present invention, a user performing a search can be provided results that are more specific to their search. Accordingly, one or more of the methodologies discussed herein may obviate a need for additional searching or navigation by the user, which may have the technical effect of reducing computing resources used by one or more devices within the system. Examples of such computing resources include, without limitation, processor cycles, network traffic, memory usage, storage space, and power consumption.

With reference to FIG. 1, an example embodiment of a high-level client-server-based network architecture 100 to provide appropriate categories and most relevant aspects is shown. A networked system 102, in an example form of a network-server-side functionality, is coupled via a communication network 104 (e.g., the Internet, wireless network, cellular network, or a Wide Area Network (WAN)) to one or more client devices 110 and 112. FIG. 1 illustrates, for example, a web client 106 operating via a browser (e.g., such as the INTERNET EXPLORER® browser developed by Microsoft® Corporation of Redmond, Washington State), and a programmatic client 108 executing on respective client devices 110 and 112.

The client devices 110 and 112 may comprise a mobile phone, desktop computer, laptop, or any other communication device that a user may utilize to access the networked system 102. In some embodiments, the client device 110 may comprise or be connectable to an image capture device (e.g., camera). The client device 110 may also comprise a voice recognition module (not shown) to receive audio input and a display module (not shown) to display information (e.g., in the form of user interfaces). In further embodiments, the client device 110 may comprise one or more of a touch screen, accelerometer, and GPS device. The client devices 110 and 112 may be a device of an individual user or business searching listings or publications on the networked system 102. In one embodiment, the networked system 102 is a network-based marketplace and the listings comprise item listings of products for sale on the network-based marketplace.

An Application Program Interface (API) server 114 and a web server 116 are coupled to, and provide programmatic and web interfaces respectively to, one or more application servers 118. The application servers 118 host a publication system 120 and a payment system 122, each of which may comprise one or more modules, applications, or engines, and each of which may be embodied as hardware, software, firmware, or any combination thereof. The application servers 118 are, in turn, coupled to one or more database servers 124 facilitating access to one or more information storage repositories or database(s) 126. In one embodiment, the databases 126 are storage devices that store information to be posted to the publication system 120. The databases 126 may also store a dictionary of appropriate categories and most relevant aspects determined for the networked system 102 in accordance with example embodiments.

The publication system 120 publishes content on a network (e.g., Internet). As such, the publication system 120 provides a number of publication and marketplace functions and services to users that access the networked system 102. The publication system 120 is discussed in more detail in connection with FIG. 2. In example embodiments, the publication system 120 is discussed in terms of a marketplace environment. However, it is noted that the publication system 120 may be associated with a non-marketplace environment such as an informational environment.

The payment system 122 provides a number of payment services and functions to users. The payment system 122 allows users to accumulate value (e.g., in a commercial currency, such as the U.S. dollar, or a proprietary currency, such as "points") in accounts, and then later to redeem the accumulated value for products (e.g., goods or services) that are made available via the publication system 120. The payment system 122 also facilitates payments from a payment mechanism (e.g., a bank account, PayPal™, or credit card) for purchases of items via a network-based marketplace. While the publication system 120 and the payment system 122 are shown in FIG. 1 to both form part of the networked system 102, it will be appreciated that, in alternative embodiments, the payment system 122 may form part of a payment service that is separate and distinct from the networked system 102.

While the example network architecture 100 of FIG. 1 employs a client-server architecture, a skilled artisan will recognize that the present disclosure is not limited to such an architecture. The example network architecture 100 can equally well find application in, for example, a distributed or peer-to-peer architecture system. The publication system 120 and payment system 122 may also be implemented as standalone systems or standalone software programs operating under separate hardware platforms, which do not necessarily have networking capabilities.

Figure 2:
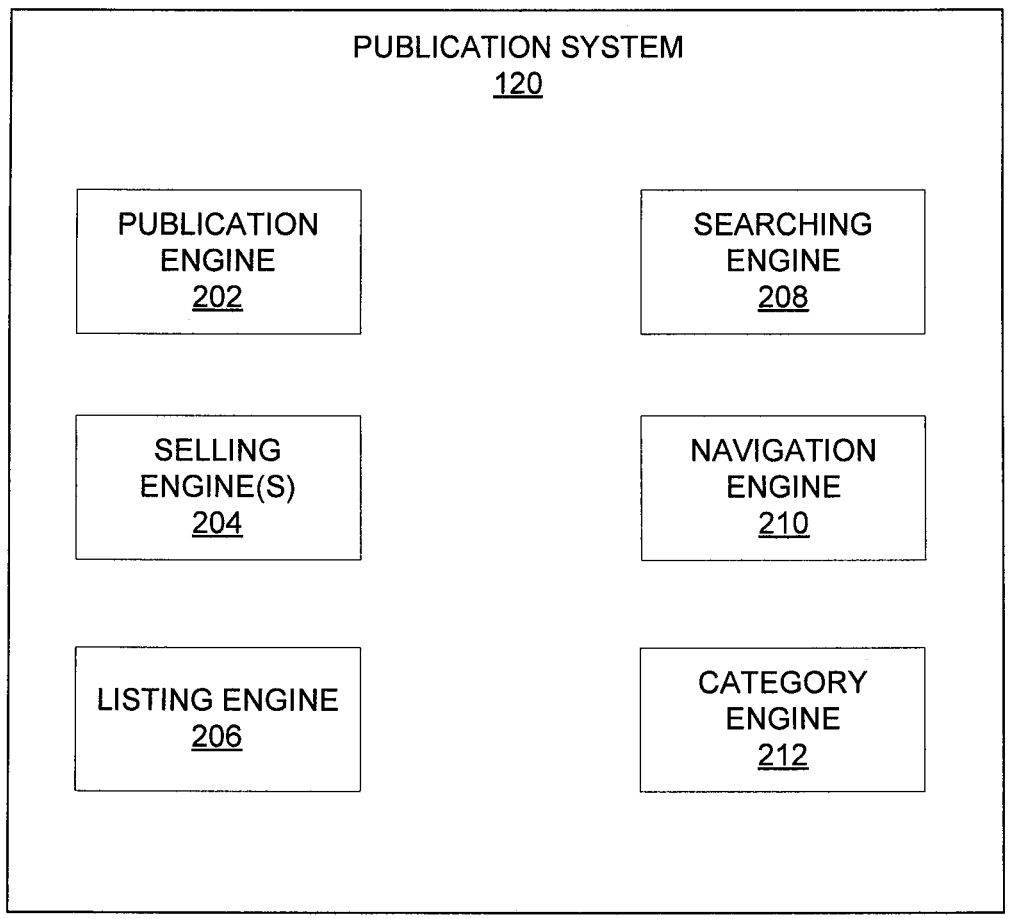
FIG. 2 is a block diagram illustrating an example embodiment of a publication system.

Referring now to FIG. 2, an example block diagram illustrating multiple components that, in one example embodiment, are provided within the publication system 120 of the networked system 102 is shown. The publication system 120 may be hosted on dedicated or shared server machines (not shown) that are communicatively coupled to enable communications between the server machines. The multiple components, themselves, are communicatively coupled (e.g., via appropriate interfaces), either directly or indirectly, to each other and to various data sources, to allow information to be passed between the components or to allow the components to share and access common data. Furthermore, the components may access the one or more database(s) 126 via the one or more database servers 124, both shown in FIG. 1.

In one embodiment, the publication system 120 comprises a network-based marketplace and provides a number of publishing, listing, and price-setting mechanisms whereby a seller (e.g., business or consumer) may list (or publish information concerning) goods or services for sale, a buyer can search for, express interest in, or indicate a desire to purchase such goods or services, and a price can be set for a transaction pertaining to the goods or services. To this end, the publication system 120 may comprise at least one publication engine 202 and one or more selling engines 204. The publication engine 202 may publish information on the publication system 120. In some embodiments, the selling engines 204 may comprise one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing and a proxy-bidding feature whereby a bidder may invoke automated proxy bidding.

A listing engine 206 allows sellers to conveniently author listings of items or authors to author publications. In one embodiment, the listings pertain to goods or services that a user (e.g., a seller) wishes to transact via the publication system 120. Each good or service is associated with a particular category. Furthermore, each listing for a good or service may be assigned an item identifier. In other embodiments, a user may create a listing that is an advertisement or other form of information publication. The listing information may then be stored to one or more storage devices coupled to the publication system 120 (e.g., databases 126).

Searching the network-based publication system 120 is facilitated by a searching engine 208. For example, the searching engine 208 enables keyword queries of listings published via the publication system 120. In example embodiments, the searching engine 208 receives the keyword queries from a device of a user and conducts a review of the storage device storing the listing information. The review will enable compilation of a result set of listings that may be sorted and returned to the client device (e.g., client device 110) of the user. The searching engine 208 may record the query (e.g., keywords) and any subsequent user actions (e.g., navigations).

In a further example, a navigation engine 210 allows users to navigate through various categories, catalogs, or inventory data structures according to which listings may be classified within the publication system 120. For example, the navigation engine 210 allows a user to successively navigate down a category tree comprising a hierarchy of categories (e.g., category tree) until a particular set of listing is reached. Various other navigation applications within the navigation engine 210 may be provided to supplement the searching and browsing applications. The navigation engine 210 may record the various user actions (e.g., clicks) performed by the user in order to navigate down the category tree.

A category engine 212 manages determination of appropriate categories and query aspects for each category. In example embodiments, the category engine 212 uses collected information from the searching engine 208 and the navigation engine 210 to create a database (e.g., dictionary) of appropriate categories and query aspects for the categories for queries. These appropriate categories and query aspects may be appended to the query (e.g., keywords) in the database. The category engine 212 will be discussed in more detail in connection with FIG. 3 below.

Although the various components of the publication system 120 have been discussed in terms of a variety of individual modules and engines, a skilled artisan will recognize that many of the items can be combined or organized in other ways. Furthermore, not all components of the publication system 120 have been included in FIG. 2. In general, components, protocols, structures, and techniques not directly related to functions of example embodiments (e.g., dispute resolution engine, loyalty promotion engine, reputation engines, listing management engines, account engine) have not been shown or discussed in detail. The description given herein simply provides a variety of example embodiments to aid the reader in an understanding of the systems and methods used herein.

Figure 3:
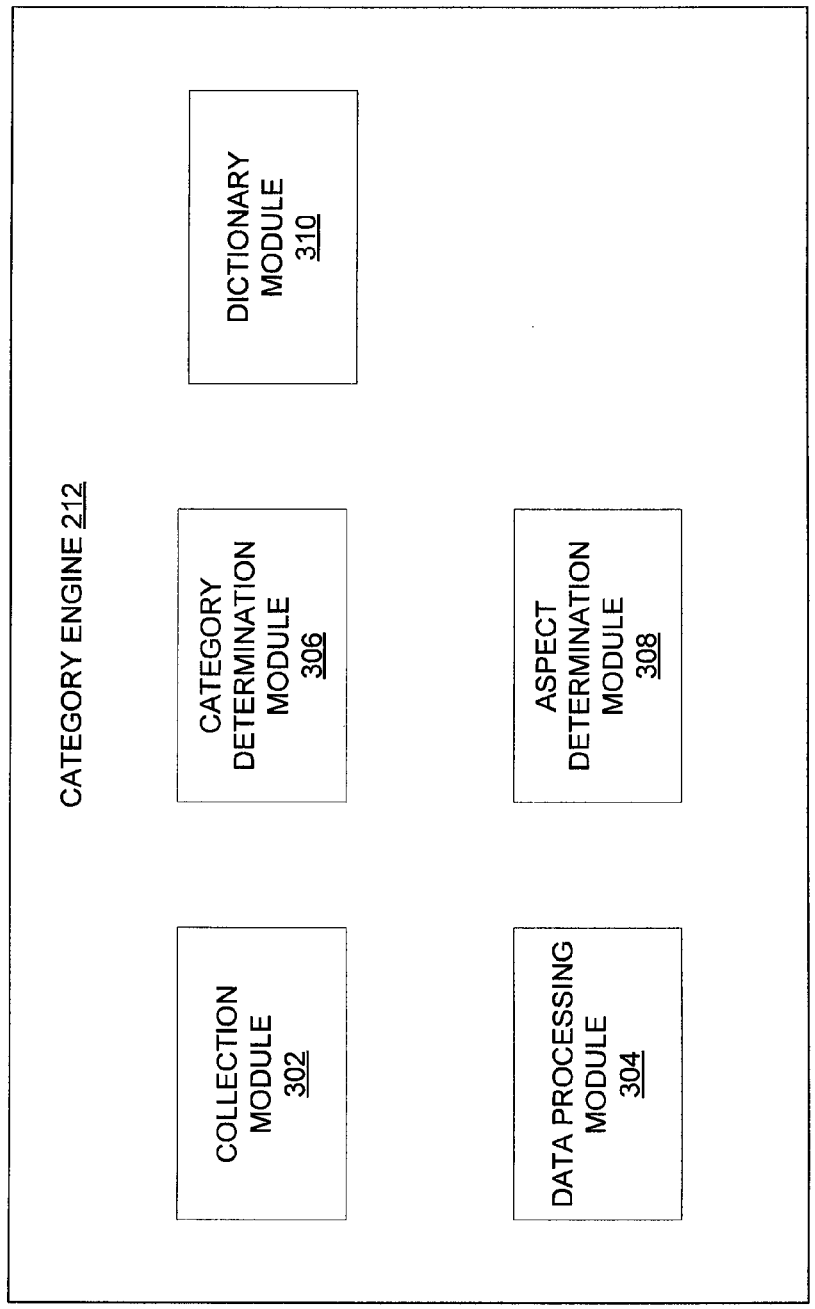
FIG. 3 is a block diagram illustrating an example embodiment of a category engine.

FIG. 3 is a block diagram illustrating an example embodiment of the category engine 212. The category engine 212 comprises components that are communicatively coupled (e.g., via appropriate interfaces), either directly or indirectly, to each other and to various data sources, to allow information to be passed between the components or to allow the components to share and access common data. The category engine 212 determines appropriate categories, category levels, and query aspects (e.g., most relevant aspect name/value pairs) for each category by mining historical data sets of logged (tracked) user action/behavior on a site (e.g., a site provided by the publication system 120). The historical data sets may comprise recorded actions by users of the site such as search queries (e.g., input keywords), specified categories and aspects, and click-through actions used to narrow a search down to a particular set of items, publications, or listings.

In example embodiments, a collection module 302 collects the historical data set recorded by and received from the searching engine 208 or the navigation engine 210. For example, a user may enter a query having a keyword "jeans," and specifies a category "Women's Clothes." The user may then select aspects of size 26 and brand "BCBG," and begins to browse resulting publications. In another example, the same or different user may query "jeans" and specifies a category "Women's Skinny Jeans." The user may then select aspects of size 26 and brand "BCBG," and begins to browse resulting publications. In a further example, the same or different user may query "jeans" and specifies a category "Men's Clothes." The user may further select aspects of condition "new" and color "black," and begins to browse the resulting publications. In all of these examples, the keywords, specified categories, and selection of various aspects (e.g., condition, style, size, brand) are tracked by the searching engine 208 and navigation engine 210 and collected by the collection module 302.

The historical data set used by the category engine 212 comprises data for a particular period of time. In one embodiment, the historical data set comprises data for the past 100 days. Alternative embodiment may utilize any length or period of time for data analysis by the category engine 212. Because the historical data set used by the category engine 212 may be continually updated with more recent logged data, the category engine 212 is able to capture current trends. For example, the category engine 212 may process the historical data set (of the last 100 days) on a weekly basis to update a database of appropriate categories and relevant aspect name/value pairs.

A data processing module 304 processes the collected historical data set. Initially, aspect demand data is determined for lower level categories. Aspect demand data comprises aspect name/aspect value pairs representing the aspects from the searching or navigation of the publication system 120 from previous queries. Referring to the jeans example above, aspect names may include brand, size, condition, style, and color. Thus, aspect values for condition may include new, new with tags, used, or unknown. In another example, aspect values for style may include low-rider, flare, skinny, boot-cut, and straight leg. Once all the aspect name/aspect value pair data are determined for each category, the aspect demand data are populated up to all higher level categories (e.g., parent categories). For example, if a user chooses to constrain a query at a L6 level (e.g., start browsing publications at this level), the corresponding aspect demand data are populated up to all L1-L5 levels. This populating methodology guarantees that the demand at a L(k−1) level is always no less than that at a L(k) level. Further discussion of the category levels will be provided in connection with the discussion of FIG. 4-FIG. 6 below.

The data processing module 304 aggregates a query's aspect demand data at all category levels. The aggregation results in a count for each aspect name/aspect value pair. For example for aspect name/aspect value=style/low-rise, a frequency or count may be determined for category=jeans. The data processing module 304 then determines aspect demand ratios for each category.

A category determination module 306 determines one or more appropriate categories to associate with a query (e.g., query "jeans") based on the aspect demand ratios. The category determination module 306 may choose a suitable category threshold to identify the appropriate categories. The category threshold is then compared to the aspect demand ratios to determine lowest level categories whose aspect demand ratios satisfy the category threshold. In one embodiment, the category threshold is 10%. Alternatively, the category threshold may be any percentage and is adjustable. Additionally, different categories may utilize different category thresholds. For example, the category threshold used for clothing categories may be different than the category threshold used for electronics categories. It is noted that the categories that satisfy the category threshold may be at different levels (e.g., L1-L6) within the category tree.

An aspect determination module 308 determines the most relevant aspect name/aspect value pairs in each category. In example embodiments, the aspect determination module 308 aggregates the aspect demand information for a category by aspect name. The aspect determination module 308 then sorts the aspect names in descending order. Next, the aspect determination module 308 sorts the aspect values for each aspect name in descending order. In example embodiments, only a top number of aspect name and value pairs are associated with the search query.

The determined appropriate categories and top number of aspect name/aspect value pairs that are associated with a search query are then stored in a database by the dictionary module 310. In one embodiment, the database comprises a dictionary from which the searching engine 208 or the navigation engine 210 may retrieve category and aspect data when providing a result for a future search query.

The operations performed by the various components of the category engine 212 will be discussed in more detail in connection with the discussion of FIG. 4-FIG. 6 below.

Figure 4:
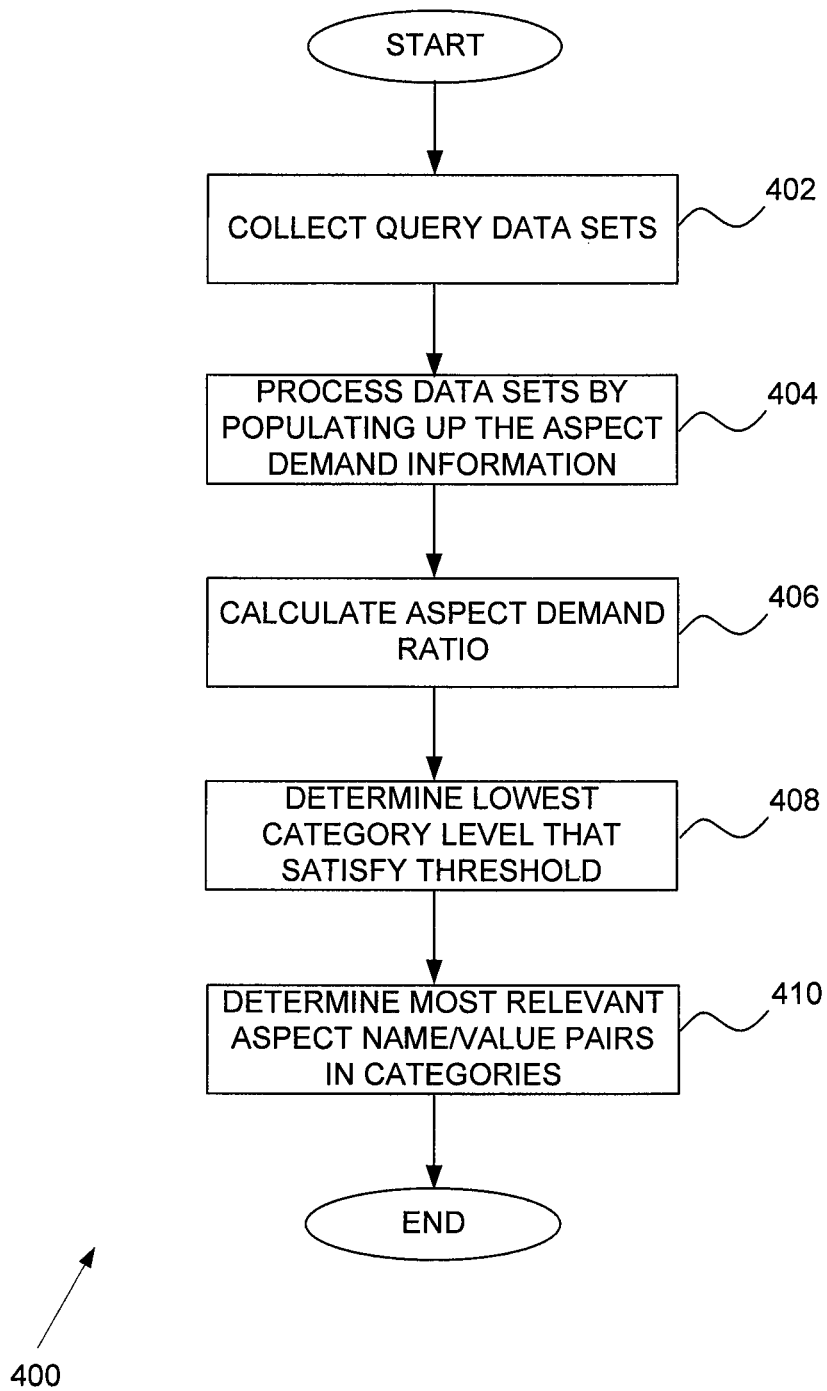
FIG. 4 is a flow diagram of an example high-level method for determining query aspects at appropriate category levels.

FIG. 4 is a flow diagram of an example high-level method 400 for determining appropriate category levels and query aspects. In operation 402, the collection module 302 collects the historical data sets recorded by and received from the searching engine 208 or the navigation engine 210. The historical data set includes aspect demand data collected from user behavior with past search queries.

Figure 5A:
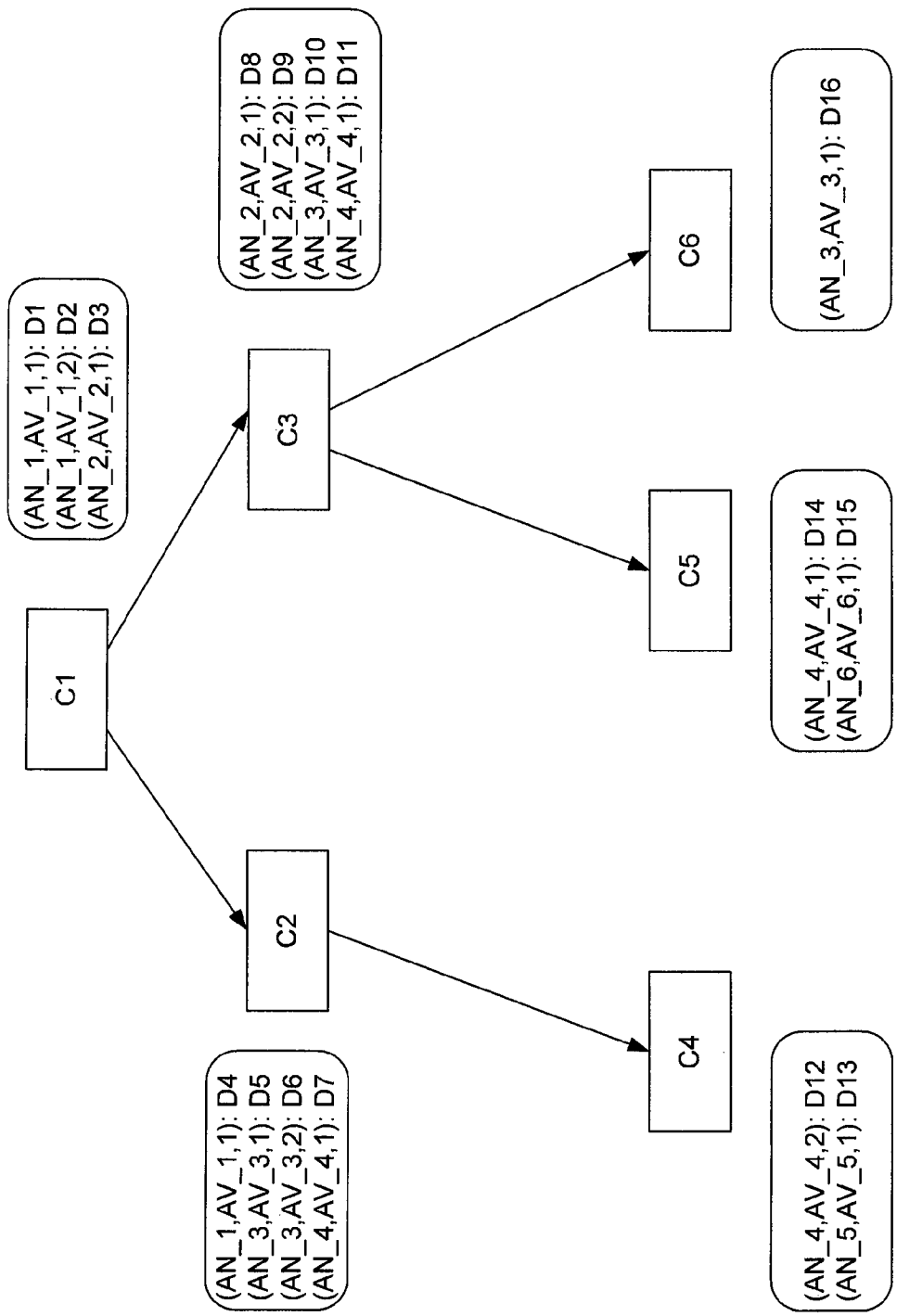
FIG. 5a is a diagram illustrating an example of aspect demand data for a query.

FIG. 5a illustrates an example of aspect demand data (e.g., aspect name/value pairs) for a query spread over six categories at three levels of a category tree. (AN_i, AV_i,j) indicates aspect name i and aspect value j, Dx indicates a count for (AN_i, AV_i,j). Using the jean query example, AN_1 may be aspect name brand. Thus, (AN_1, A_1,1) may represent (brand, 7 For All Mankind), while (AN_1, AV_1, 2) may represent (brand, True Religion).

Referring back to FIG. 4, the historical data sets are processed by the data processing module 304 in operation 404. More specifically, the aspect demand data is populated up the category tree by the data processing module 304.

Figure 5B:
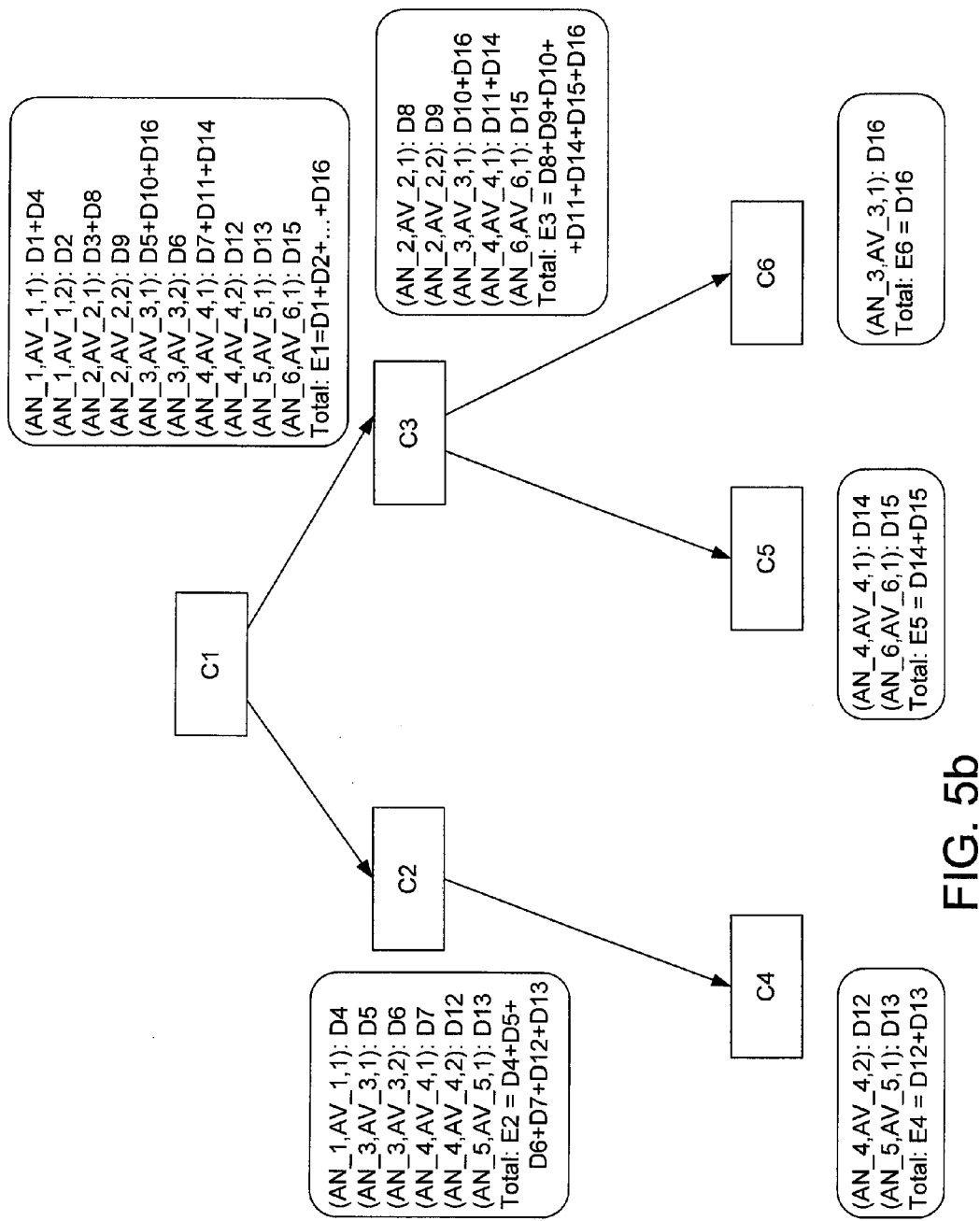
FIG. 5b is a diagram illustrating rolling up of aspect demand data.

FIG. 5b illustrates the populating algorithm performed by the data processing module 304. As shown, the aspect demand data from the categories of the third level of the category tree (e.g., categories C4, C5, and C6) are populated up to the categories of the second level of the category tree (e.g., category C2 and C3). Similarly, the aspect demand data from the categories of the second level are populated up to category C1 in the first level of the category tree.

A total count for each of the categories is aggregated. For example, a total count (E4) for category C4 is equal to a summation of the counts for the two aspect name/value pairs D12 and D13 from category C4. The total count for the first level category C1 is thus equal to all the counts in the category tree.

Figure 5C:
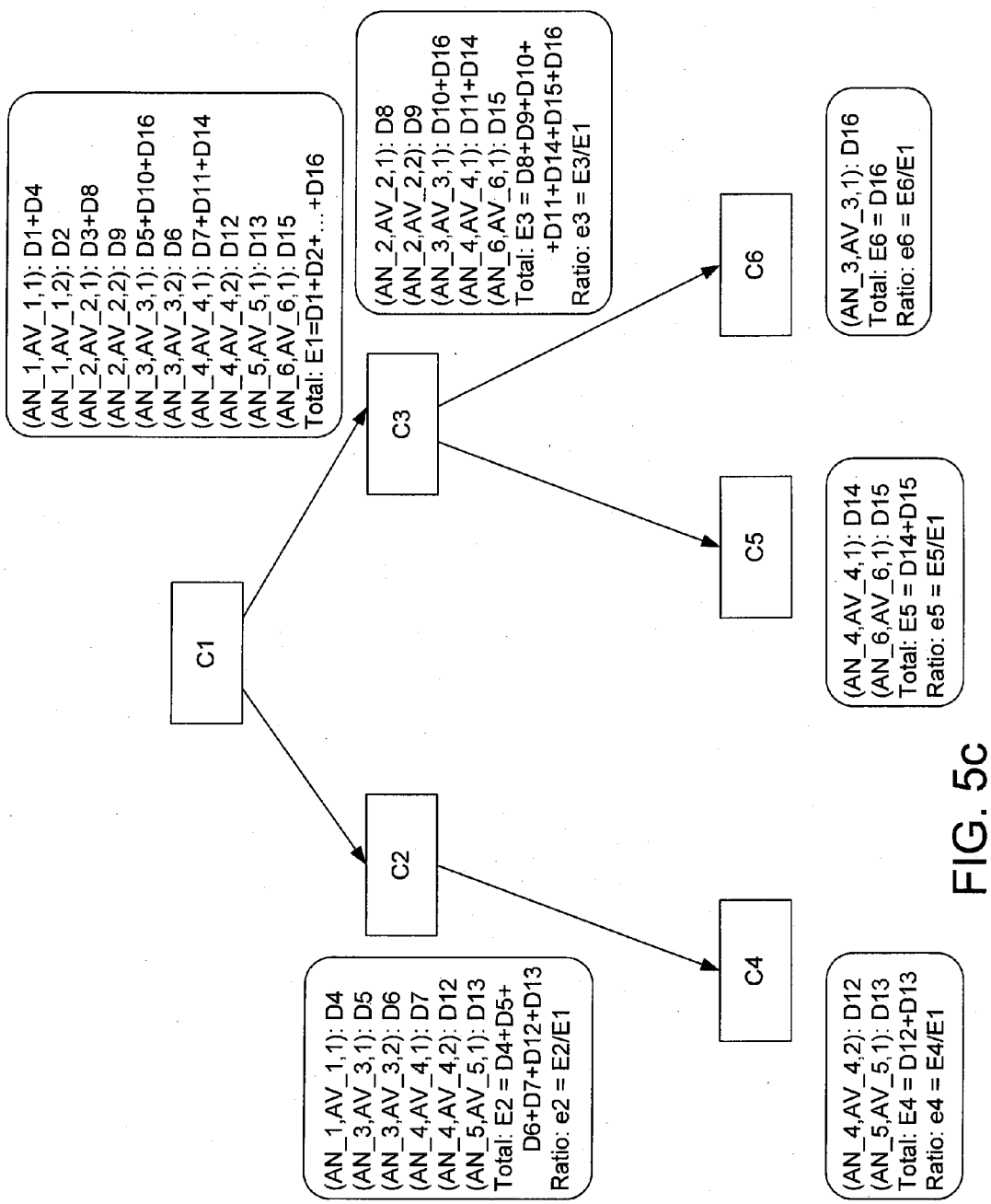
FIG. 5c is a diagram illustrating calculations of aspect demand ratios.

Referring back to FIG. 4, aspect demand ratios are calculated in operation 406 by the data processing module 304. Each aspect demand ratio is a value equal to the aspect demand total count for the category divided by the total count determined for the highest level category in the category tree (e.g., the first level category). FIG. 5c illustrates ratios calculated for each category. For example, the ratio for category C3 is equal to the total count (E3) for category C3 divided by the total count (El) of the first level category C1.

Once the aspect demand ratios are calculated, the lowest level categories that satisfy (e.g., is equal to or exceeds) a category threshold are determined in operation 408 of FIG. 4. In example embodiments, the category determination module 306 compares the aspect demand ratios to the category threshold to determine the lowest level categories whose aspect demand ratio satisfies the category threshold.

Figure 5D:
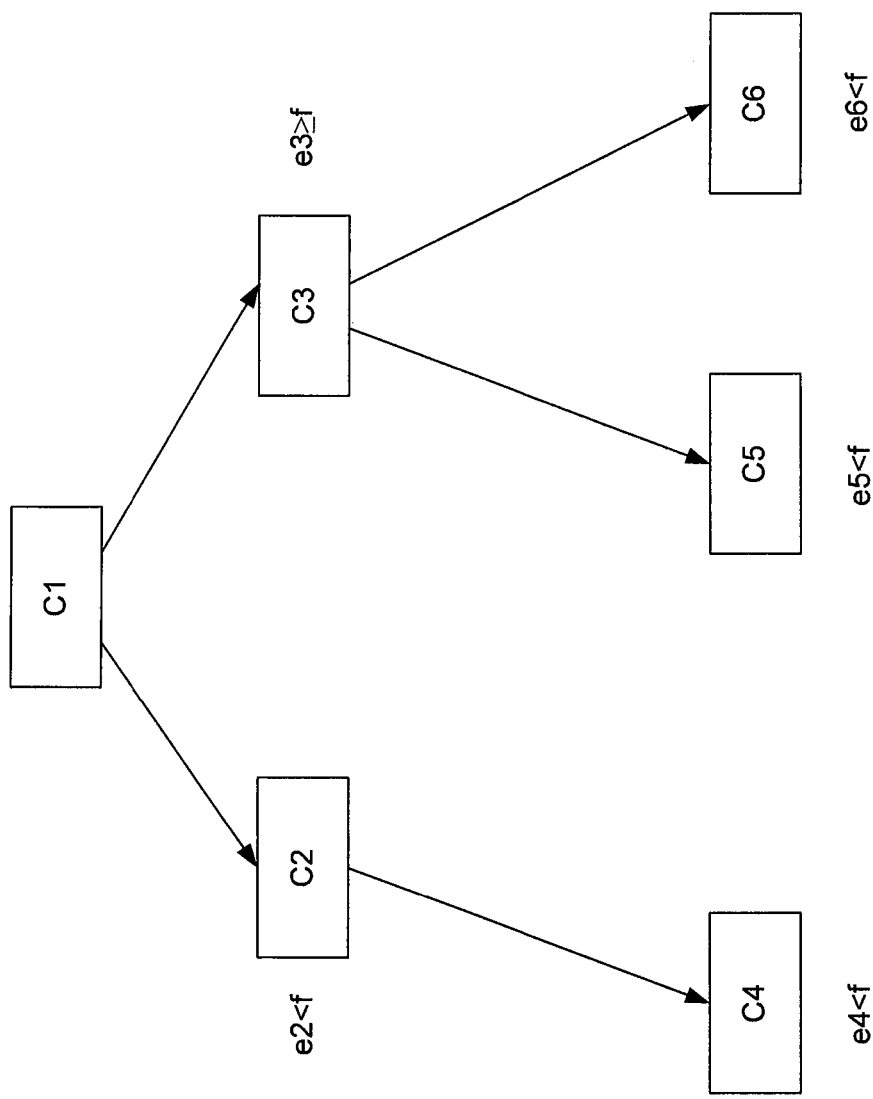
FIG. 5d-FIG. 5g are diagrams illustrating various examples of lowest level categories based on an aspect demand ratio threshold.
Figure 5E:
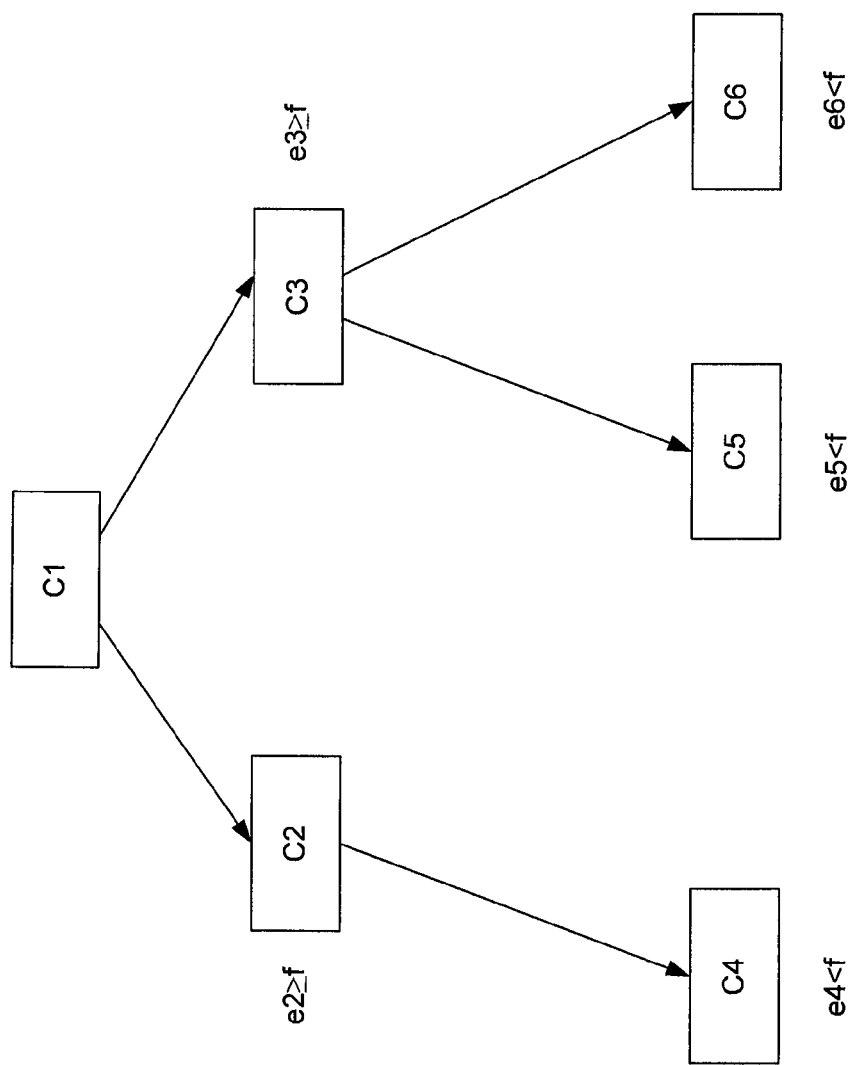
Figure 5F:
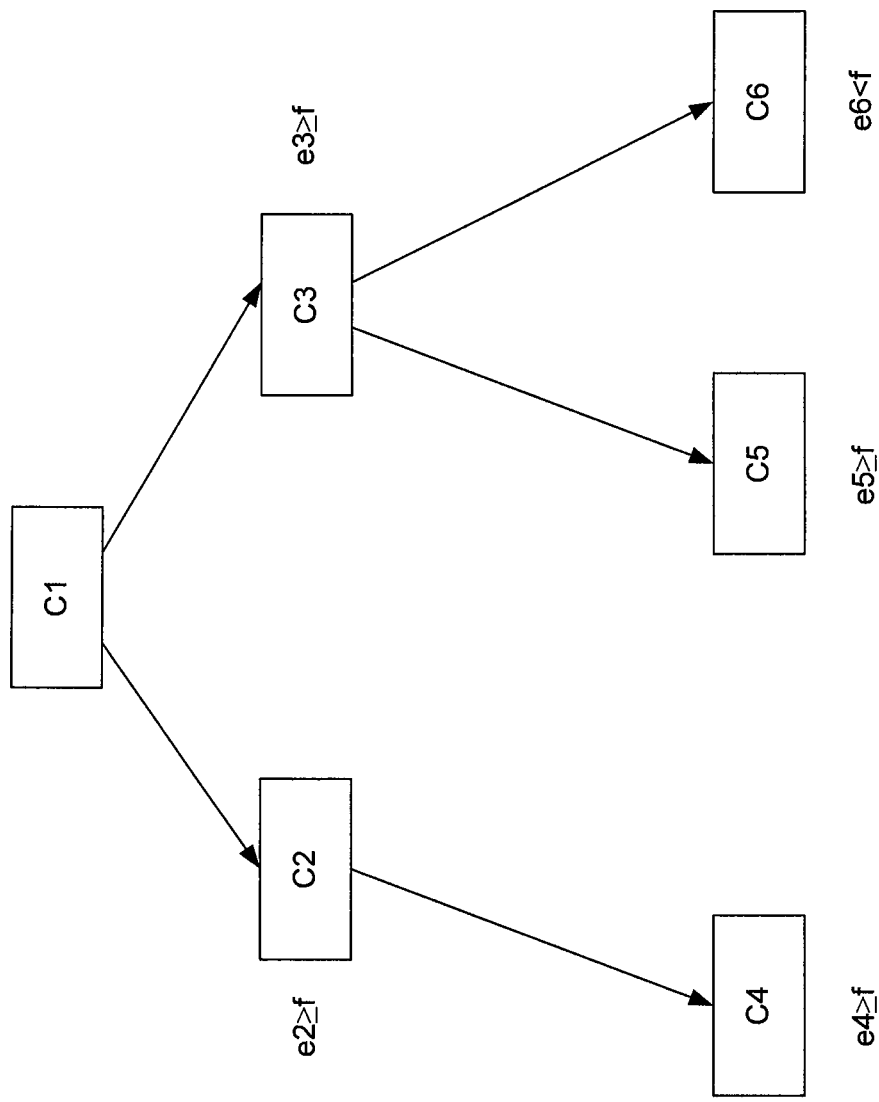
Figure 5G:
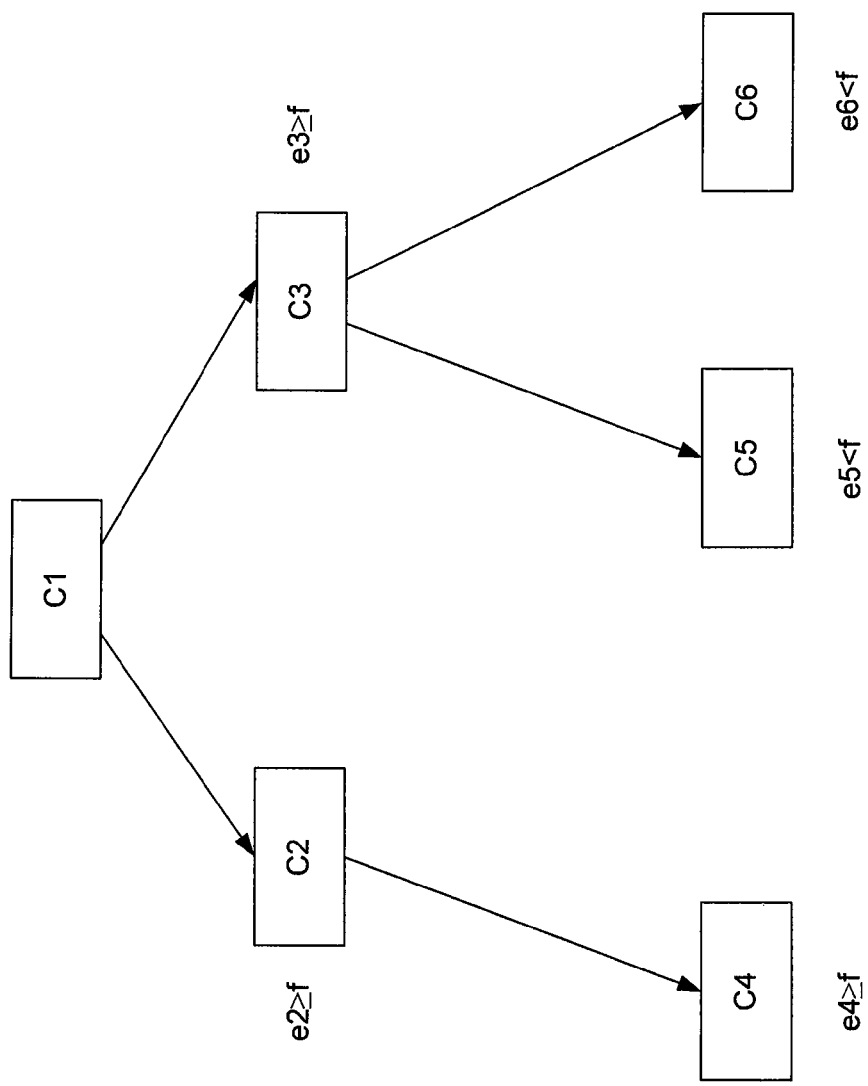

For example and referring to FIG. 5d, assume that the category threshold is f. As shown, the lowest level category that satisfies the category thresholdfis category C3 (e.g., e3≥f). While only one category is shown in FIG. 5d as satisfying the category threshold, alternative embodiments may have more than one category that satisfies the category threshold. For example, FIG. 5e shows both categories C2 and C3 having aspect demand ratios that satisfy the category threshold. In other embodiments, categories from different category levels may satisfy the category threshold. In a further example, FIG. 5f shows categories C4 and C5 in the third level as well as categories C2 and C3 in the second level as satisfying the category threshold. Because categories C4 and C5 are lower level categories than category C2 and C3, category C4 and C5 are identified as the lowest level categories that satisfy the category threshold. It is further noted that categories from different category levels in different branches of the category tree may be selected as the lowest level categories satisfying the category threshold. For example, FIG. 5g shows category C4 in one branch of the category tree satisfying the category threshold, while category C3 in another branch and one level higher satisfies the category threshold.

Referring back to FIG. 4, the most relevant aspect name/value pairs in each category is determined in operation 410. In one embodiment, the aspect determination module 308 performs this determination by aggregating the aspect demand data for a category by aspect name, sorting the aspect names in descending order, and sorting the aspect values for each aspect name in descending order. In example embodiments, only a top number of aspect name and value pairs are associated with the search query. By performing the sort for each category, different categories will identify different aspect name/value pairs as relevant.

Referring again to FIG. 5b for example, category C3 has five aspect name/value pairs. In descending aspect name order, AN_2 has two entries and is top ranked. The next top ranking aspect names are AN_3 and AN_4. While AN_3 and AN_4 each only have one entry, both entries have a higher count (e.g., AN_3 has a count equal to D10+D16) than AN_6 (with only a single count D15). Once the order of the aspect names is determined, the values or counts for the aspect names may be sorted. Therefore, for aspect name AN_2, the counts of AV_2,1 (D8) and AV_2,2 (D9) are compared. The larger demand indicates the aspect value is more relevant or important.

The determined appropriate categories and top number of aspect name and value pairs that are associated with a search query may be stored in a database by the dictionary module 310. The database comprises a dictionary from which the searching engine 208 or the navigation engine 210 may retrieve category and aspect data when providing a result from a future search query.

Figure 6:
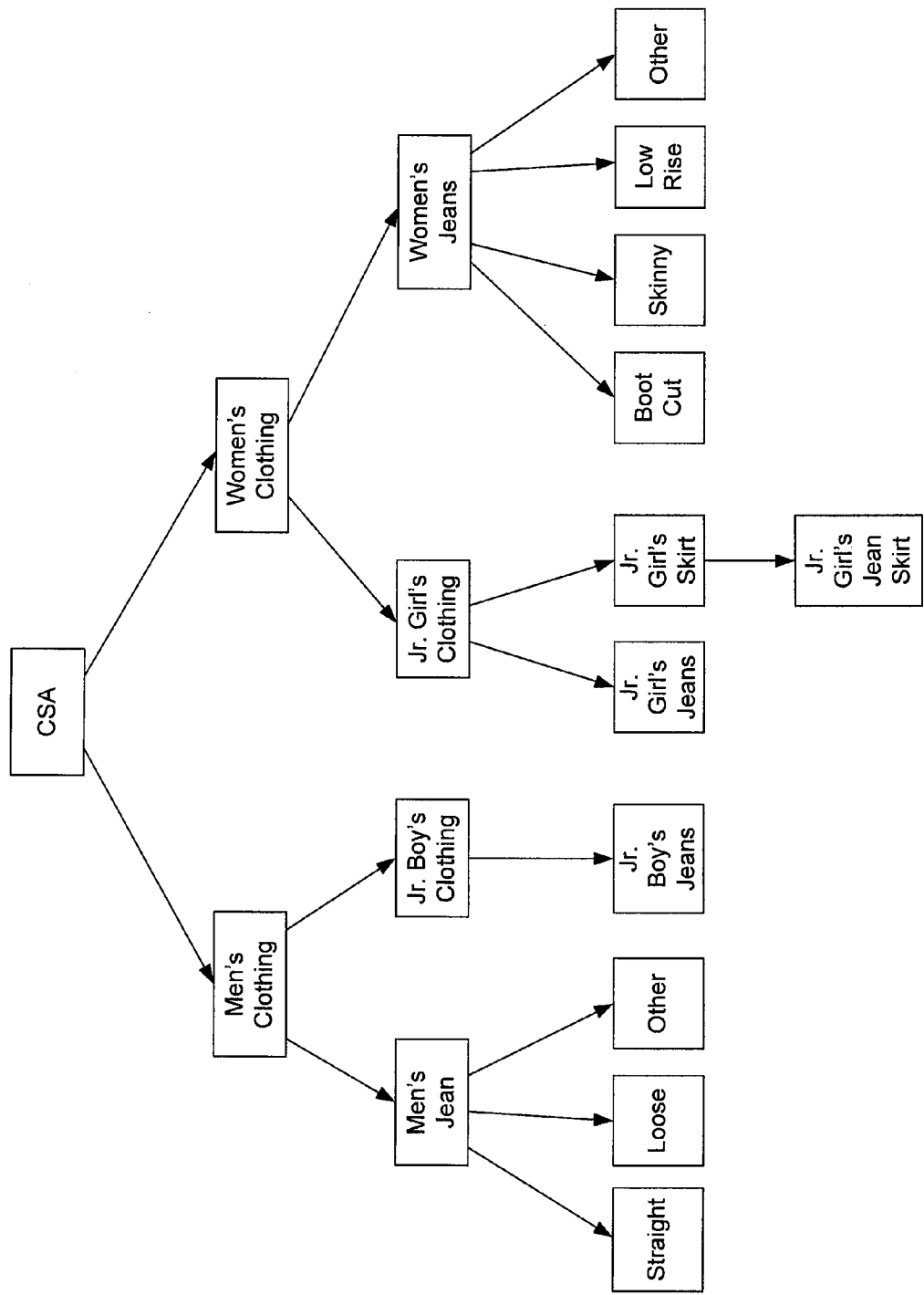
FIG. 6 is a diagram of an example category tree.

To further illustrate the operations of example embodiment, reference is made to FIG. 6, which is a diagram of an example category tree related to "jeans." Each category of the category tree may have a different set of relevant aspect names. For example, a CSA (clothes, shoes, and accessories) level 1 category may have relevant aspects directed to condition, price, seller, and buying format. A Women's Clothing level 2 category may have relevant aspects directed to women's brand, women's clothing size, color, and aspects inherited from CSA. Moving further down in levels, a Women's Jeans category may comprise relevant aspects of women's popular jeans brand, jeans bottom size, jeans style, jeans inseam, and aspects inherited from CSA and Women's Clothing categories. Within the jean style category, aspects of boot-cut, skinny, low-rise, and other are identified. Within the skinny (jeans) category, relevant aspects may comprise women's popular skinny jeans brand, women's skinny jeans material, and aspects inherited from higher level categories. As such, each category at each level may comprise different relevant aspects (e.g., aspect names).

Additionally, categories within the same level may comprise different relevant aspects and corresponding values. For example, within the Women's Jeans category, the relevant aspects (e.g., aspect name) in descending order may be size, brand, style, and inseam. Furthermore, the relevant values for brand in descending order may be 7 For All Mankind, True Religion, American Eagle, Abercrombie & Fitch, and Levis, while relevant values for style in descending order may be boot cut, slim/skinny, low-rise/hipster, and stretch.

In contrast, the Men's Jeans category may comprise relevant aspects in descending order of waist size, brand, inseam, and style. The relevant values for brand in descending order may be Levis, Diesel, 7 For All Mankind, Ralph Lauren, and Calvin Klein, while relevant values for style in descending order may be boot cut, straight leg, relaxed, and classic.

Figure 7A:
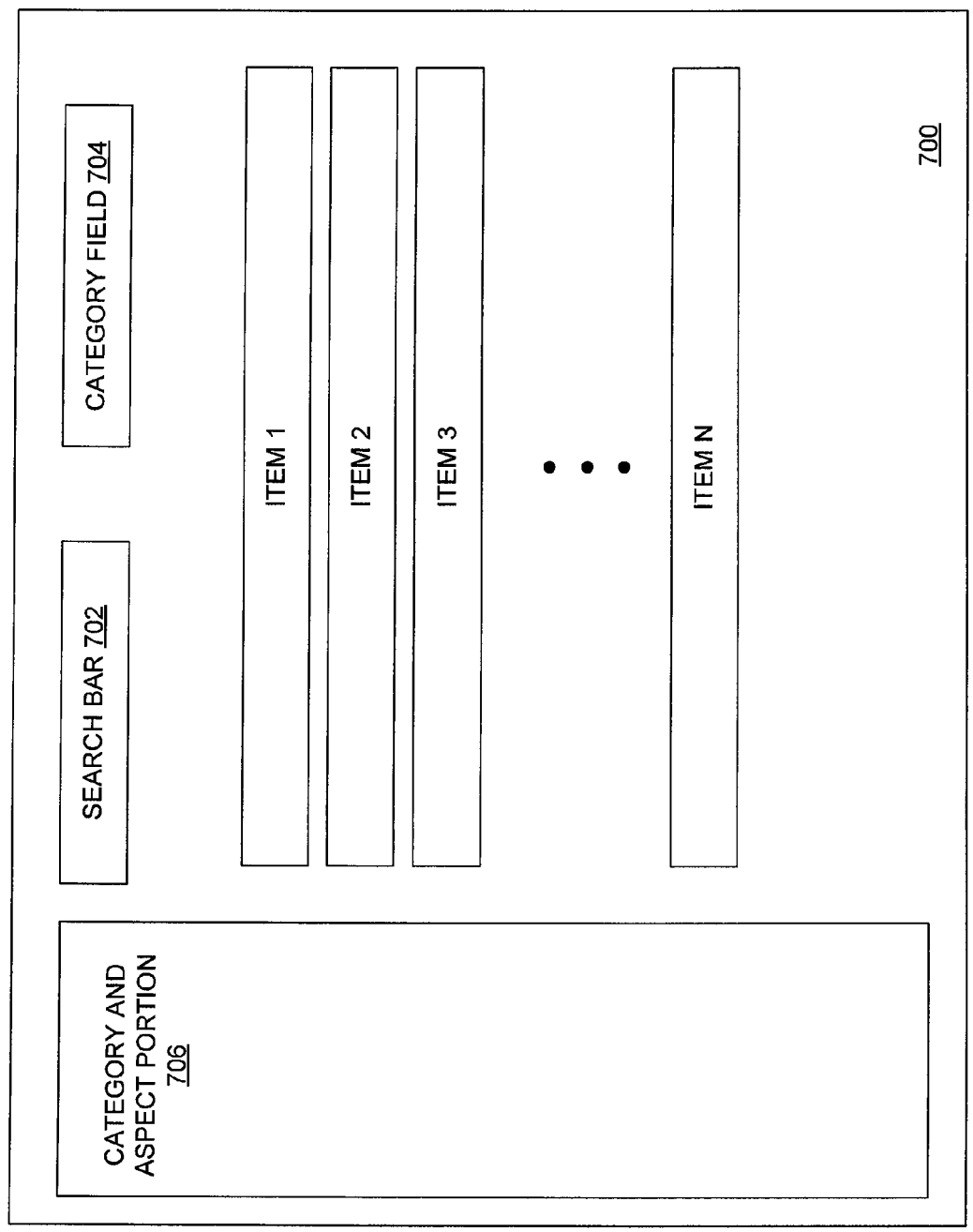

By applying operations of example embodiments, when a user enters a new query, the query's appropriate category context can be determined and relevant search results returned. Referring to FIG. 7a, an example user interface (UI) 700 for performing a search is shown. The example UI 700 provides a search bar 702 where a keyword query is entered. The user may also provide a category or aspects in a category field 704 for a more focused search. The category field 704 may, in accordance with one embodiment, be a drop down menu. The searching engine 208 or the navigation engine 210 tracks and logs all of this information as well as any further navigations performed on the search results.

The category engine 212 performs a look-up in a dictionary to determine the most appropriate categories and aspect name/value pairs to provide in a category and aspect portion 706 based on the query. Thus, the category and aspect portion 706 helps facilitate the navigation process. The UI 700 also returns a plurality of item listings or publications (e.g., item 1 through item N) that satisfies the query. The plurality of publications may be ordered in terms of relevancy. For example, assume a query for "women's jeans." If a publication does not specify relevant aspects such as size, brand, inseam, or style, the publication may be demoted in a list of returned results. Additionally, the publications may be ordered according to the relevant aspects that are specified. For example, if the publication indicates an aspect name/value pair that is the most relevant for a category, the publication may be promoted on the list of returned results. For example, items with more popular brands (e.g., 7 For All Mankind), as determined by the category engine 212, may be promoted in the list of returned results over publications with less popular or relevant brands (e.g., Old Navy).

Referring now to FIG. 7b, the category and aspect portion 706 of FIG. 7a is expanded to illustrate an example category and aspect portion 706 for a query for "jeans." By using the category engine 212, a dictionary or database of appropriate categories and currently relevant aspect name/value pairs for a jeans query is compiled and may be used for a lookup upon receiving a new query. When the new query is submitted, the appropriate categories are identified from the dictionary and listed in the category and aspect portion 706. In the present example, the appropriate categories are Women's Jean, Men's Jeans, Jr. Boy's Jeans, and Jr. Girl's Jeans.

Within the Women's Jeans category, the most relevant aspect is size with sizes 4, 8, and 10 being the most relevant values for the size aspect. The next most relevant aspect is brand with 7 For All Mankind, True Religion, and American Eagle as the most relevant values for the brand aspect. Style is the next most relevant aspect for Women's Jeans.

Within the Men's Jeans category, the most relevant aspect is waist size with sizes 34 and 38 as the most relevant values for the waist size aspect. The next most relevant aspect is brand followed by inseam and style.

By providing the more appropriate categories and relevant aspect name/value pairs, the user is able to more quickly narrow down on the category of interest (e.g., with a single selection) rather than having to navigate through multiple levels of categories to reach the same set of results (e.g., listings or publications). Particular publications may also be promoted or demoted based on the current most appropriate categories and relevant aspect name/value pairs.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 8:
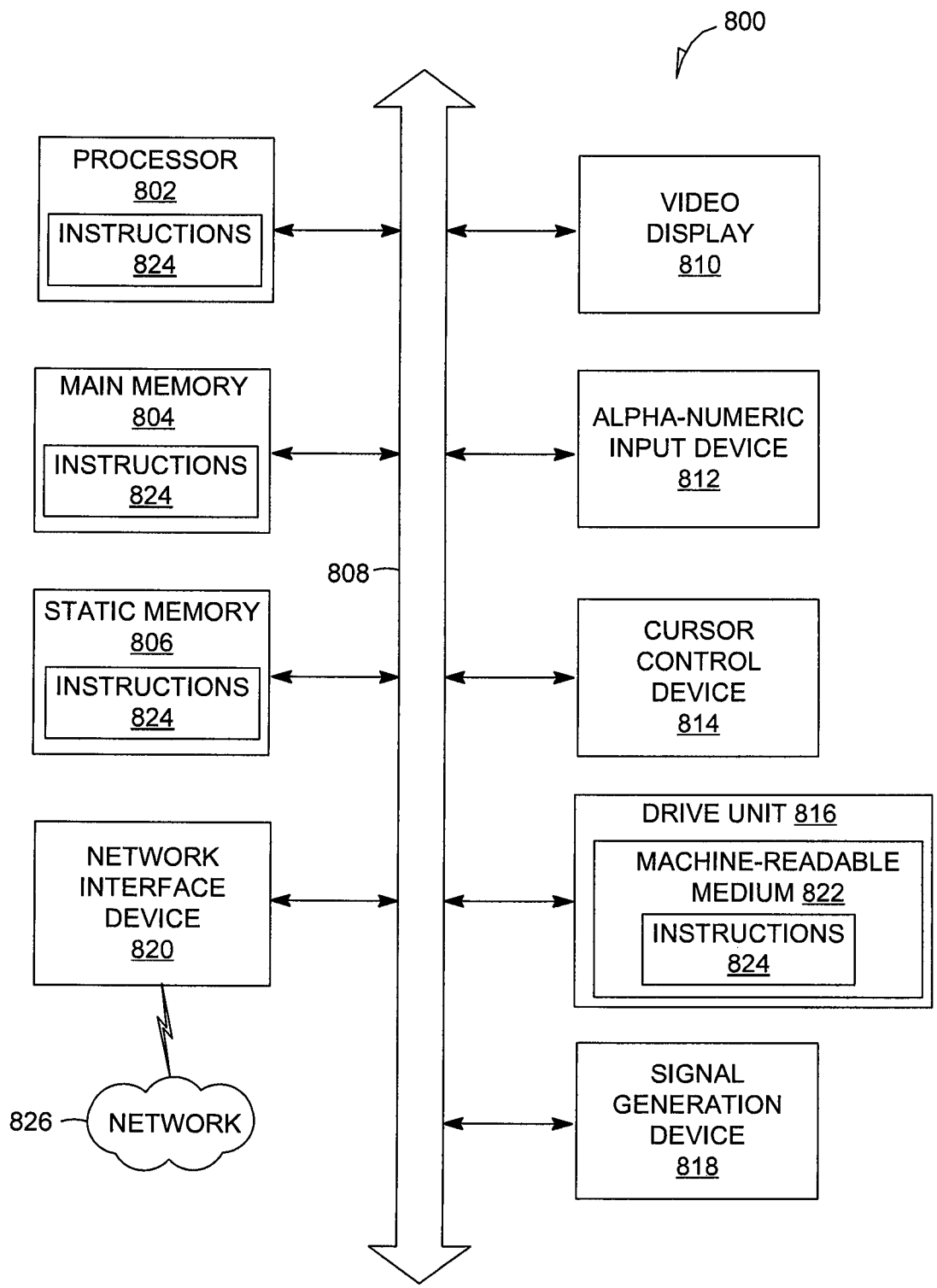
FIG. 8 is a simplified block diagram of a machine in an example form of a computing system within which a set of instructions for causing the machine to perform any one or more of the methodologies discussed herein may be executed.

With reference to FIG. 8, an example embodiment extends to a machine in the example form of a computer system 800 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In example embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

Machine-Readable Storage Medium

The disk drive unit 816 includes a machine-readable storage medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, with the main memory 804 and the processor 802 also constituting machine-readable media.

While the machine-readable storage medium 822 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    collecting query data, the query data indicating a query term and tracked user behavior associated with past queries involving the query term;
    calculating, using the collected query data, an aspect demand ratio for each category of a category tree that comprises listings of items, the category tree comprising a hierarchy of categories organized into a plurality of levels, the aspect demand ratio calculated based on an aspect demand total count for a category divided by a total count of a highest level category in the hierarchy of the category tree, the calculating performed by a hardware processor;
    using the aspect demand ratio for each category to determine one or more lowest level categories in the hierarchy of the category tree that satisfies a category threshold;
    appending the one or more lowest level categories in the hierarchy of the category tree and a top number of aspect name/value pairs of the items in the listings within the one or more lowest level categories in the hierarchy of the category tree to the query term in a database;
    receiving, via a user interface, a new query;
    performing a lookup in the database using a query term of the new query to determine the one or more lowest level categories in the hierarchy of the category tree and the top number of aspect name/value pairs of the items in the listings within the one or more lowest level categories in the hierarchy of the category tree corresponding to the query term of the new query; and
    causing presentation, in a category and aspect portion of the user interface, of the one or more lowest level categories and the top number of aspect name/value pairs of the items in the listings within the one or more lowest level categories, each entry in the category and aspect portion being selectable to narrow down on a category of interest.

2. The method of claim 1, further comprising determining aspect demand data for each category of the category tree from the collected query data, the aspect demand data indicating the aspect name/aspect value pairs from the past queries.

3. The method of claim 2, further comprising populating aspect demand data up to higher level categories in the hierarchy of the category tree from lower level categories included within the higher level categories, the higher level categories being parent categories of the lower level categories.

4. The method of claim 3, further comprising aggregating counts of the aspect demand data for each category of the category tree, the counts of the aspect demand data being used in the calculating of the aspect demand ratio.

5. The method of claim 1, further comprising adjusting the category threshold.

6. The method of claim 1, further comprising determining at least one relevant aspect name for the one or more lowest level categories in the hierarchy of the category tree.

7. The method of claim 6, wherein the determining of the at least one relevant aspect name comprises:
    aggregating counts based on the aspect demand data for aspect names of the one or more lowest level categories; and
    sorting the aspect names in descending order based on the counts.

8. The method of claim 6, further comprising determining at least one relevant aspect value for the at least one relevant aspect name.

9. The method of claim 8, wherein the determining of the at least one relevant aspect value comprises:
    sorting aspect values for the at least one relevant aspect name in descending order based on the counts determined from the aspect demand data.

10. The method of claim 9, further comprising appending the at least one relevant aspect name and the at least one relevant aspect value for the one or more lowest level categories to the query term in the database.

11. A system comprising:
    one or more processors; and
    a memory storing instructions that, when executed by the one or more processors, cause the one or more processors to perform operations comprising:
        collecting query data, the query data indicating a query term and tracked user behavior associated with past queries involving the query term;
        calculating, using the collected query data, an aspect demand ratio for each category of a category tree that comprises listings of items, the category tree comprising a hierarchy of categories organized into a plurality of levels, the aspect demand ratio calculated based on an aspect demand total count for a category divided by a total count of a highest level category in the hierarchy of the category tree;
        determining, using the aspect demand ratio for each category, one or more lowest level categories in the hierarchy of the category tree that satisfies a category threshold;
        appending the one or more lowest level categories in the hierarchy of the category tree and a top number of aspect name/value pairs of the items in the listings within the one or more lowest level categories in the hierarchy of the category tree to the query term in a database; and
        receiving, via a user interface, a new query;
        performing a lookup in the database using a query term of the new query to determine the one or more lowest level categories in the hierarchy of the category tree and the top number of aspect name/value pairs of the items in the listings within the one or more lowest level categories in the hierarchy of the category tree corresponding to the query term of the new query; and causing presentation, in a category and aspect portion of the user interface, of the one or more lowest level categories and the top number of aspect name/value pairs of the items in the listings within the one or more lowest level categories, each entry in the category and aspect portion being selectable to narrow down on a category of interest.

12. The system of claim 11, wherein the operations further comprise:
determining aspect demand data for each category of the category tree from the collected query data, the aspect demand data indicating the aspect name/aspect value pairs from the past queries;
populating aspect demand data up to higher level categories in the hierarchy of the category tree from lower level categories included within the higher level categories, the higher level categories being parent categories of the lower level categories; and
aggregating counts of the aspect demand data for each category of the category tree, the counts of the aspect demand data being used in the calculating of the aspect demand ratio.

13. The system of claim 11, wherein the operations further comprise determining at least one relevant aspect name for the one or more lowest level categories in the hierarchy of the category tree and configured to determine at least one relevant aspect value for the at least one relevant aspect name.

14. A machine-readable hardware storage device storing instructions which, when executed by the at least one processor of a machine, causes the machine to perform operations comprising:
collecting query data, the query data indicating a query term and tracked user behavior associated with past queries involving the query term;
calculating, using the collected query data, an aspect demand ratio for each category of a category tree that comprises listings of items, the category tree comprising a hierarchy of categories organized into a plurality of levels, the aspect demand ratio calculated based on an aspect demand total count for a category divided by a total count of a highest level category in the hierarchy of the category tree;
using the aspect demand ratio for each category to determine one or more lowest level categories of the category tree that satisfies a category threshold;
appending the one or more lowest level categories in the hierarchy of the category tree and a top number of aspect name/value pairs of the items in the listings within the one or more lowest level categories in the hierarchy of the category tree to the query term in a database;
receiving, via a user interface, a new query;
performing a lookup in the database using a query term of the new query to determine the one or more lowest level categories in the hierarchy of the category tree and the top number of aspect name/value pairs of the items in the listings within the one or more lowest level categories in the hierarchy of the category tree corresponding to the query term of the new query; and
causing presentation, in a category and aspect portion of the user interface, of the one or more lowest level categories and the top number of aspect name/value pairs of the items in the listings within the one or more lowest level categories, each entry in the category and aspect portion being selectable to narrow down on a category of interest.

15. The machine-readable hardware storage device of claim 14, wherein the operations further comprise:
determining aspect demand data for each category of the category tree from the collected query data, the aspect demand data indicating the aspect name/aspect value pairs from the past queries;
populating aspect demand data up to higher level categories in the hierarchy of the category tree from lower level categories included within the higher level categories, the higher level categories being parent categories of the lower level categories; and
aggregating counts of the aspect demand data for each category of the category tree, the counts of the aspect demand data being used in the calculating of the aspect demand ratio.

16. The machine-readable hardware storage device of claim 14, wherein the operations further comprise determining at least one relevant aspect name for the one or more lowest level categories in the hierarchy.

17. The machine-readable hardware storage device of claim 16, wherein the operations further comprise determining at least one relevant aspect value for the at least one relevant aspect name.

* * * * *

UNITED STATES PATENT AND TRADEMARK OFFICE
CERTIFICATE OF CORRECTION

PATENT NO. : 9,552,425 B2
APPLICATION NO. : 13/152174
DATED : January 24, 2017
INVENTOR(S) : Zhong et al.

It is certified that error appears in the above-identified patent and that said Letters Patent is hereby corrected as shown below:

In Column 14, Line 58, in Claim 11, after "database;", delete "and"

Signed and Sealed this
Tenth Day of April, 2018

Andrei Iancu
*Director of the United States Patent and Trademark Office*